United States Patent
Fei et al.

(10) Patent No.: US 10,935,308 B2
(45) Date of Patent: Mar. 2, 2021

(54) REFRIGERATOR AND LUMINOUS SHELF THEREOF

(71) Applicant: QINGDAO HAIER CO., LTD., Qingdao (CN)

(72) Inventors: Bin Fei, Qingdao (CN); Yazhou Shang, Qingdao (CN); Dengqiang Li, Qingdao (CN)

(73) Assignee: QINGDAO HAIER CO., LTD., Qingdao (CN)

( * ) Notice: Subject to any disclaimer, the term of this patent is extended or adjusted under 35 U.S.C. 154(b) by 0 days.

(21) Appl. No.: 16/640,348

(22) PCT Filed: Dec. 20, 2018

(86) PCT No.: PCT/CN2018/122302
§ 371 (c)(1),
(2) Date: Feb. 19, 2020

(87) PCT Pub. No.: WO2019/128834
PCT Pub. Date: Jul. 4, 2019

(65) Prior Publication Data
US 2020/0355425 A1 Nov. 12, 2020

(30) Foreign Application Priority Data
Dec. 25, 2017 (CN) .......................... 201711424112.X

(51) Int. Cl.
*F25D 27/00* (2006.01)
*F21V 13/04* (2006.01)
(Continued)

(52) U.S. Cl.
CPC ............ *F25D 27/005* (2013.01); *F21V 13/04* (2013.01); *F21V 23/045* (2013.01);
(Continued)

(58) Field of Classification Search
CPC ........ F25D 27/00; F25D 27/005; F21V 13/04; F21V 23/045
See application file for complete search history.

(56) References Cited

U.S. PATENT DOCUMENTS 6,918,679 B2 * 7/2005 Wu .................... A47F 5/0018
362/127
7,201,487 B2 * 4/2007 Pinter .................... A47B 96/02
362/133
(Continued)

FOREIGN PATENT DOCUMENTS

CN 1538106 A 10/2004
CN 1576761 A 2/2005
(Continued)

*Primary Examiner* — Matthew J. Peerce
(74) *Attorney, Agent, or Firm* — Cheng-Ju Chiang

(57) ABSTRACT

The present invention provides a luminous shelf, comprising: a shelf plate made of a transparent material, having an upper surface formed as a carrying plane of the luminous shelf; and a luminous strip lamp provided on one side of the shelf plate, a plurality of lamp beads being arranged in the luminous strip lamp at intervals in a length direction thereof, the luminous strip lamp having a mounting plane, and the plural lamp beads being arranged in a direction perpendicular to the mounting plane; the luminous strip lamp is placed obliquely relative to the shelf plate, such that an comprised angle is formed between the mounting plane and the carrying plane.

8 Claims, 3 Drawing Sheets

(51) Int. Cl.
 *F21V 23/04* (2006.01)
 *F21V 33/00* (2006.01)
 *F25D 25/02* (2006.01)
 *F21Y 115/10* (2016.01)
(52) U.S. Cl.
 CPC .......... *F21V 33/0044* (2013.01); *F25D 25/02* (2013.01); *F21Y 2115/10* (2016.08)

(56) References Cited

U.S. PATENT DOCUMENTS

| | | | |
|---|---|---|---|
| 8,215,795 B2 * | 7/2012 | Pichel | A47F 11/10 362/249.02 |
| 2015/0023000 A1 * | 1/2015 | Kendall | F25D 27/00 362/92 |

FOREIGN PATENT DOCUMENTS

| | | |
|---|---|---|
| CN | 201662298 U | 12/2010 |
| CN | 201903255 U | 7/2011 |
| CN | 201983585 U | 9/2011 |
| CN | 202393162 U | 8/2012 |
| CN | 103827582 A | 5/2014 |
| CN | 104755864 A | 7/2015 |
| CN | 105300022 A | 2/2016 |
| CN | 105674664 A | 6/2016 |
| CN | 205824929 U | 12/2016 |
| CN | 106766474 A | 5/2017 |
| CN | 206459422 U | 9/2017 |
| CN | 107356041 A | 11/2017 |
| CN | 206755728 U | 12/2017 |
| CN | 108317805 A | 7/2018 |
| CN | 108344241 A | 7/2018 |
| CN | 108458543 A | 8/2018 |
| DE | 102010001453 A1 | 8/2011 |
| DE | 102015007839 A1 | 12/2016 |
| DE | 102015119598 A1 | 5/2017 |
| JP | 2007-278698 A | 10/2007 |
| JP | 2011-12917 A | 1/2011 |

* cited by examiner

REFRIGERATOR AND LUMINOUS SHELF THEREOF

The present application is a 35 U.S.C. § 371 National Phase conversion of International (PCT) Patent Application No. PCT/CN2018/122302, filed on Dec. 20, 2018, which claims priority to Chinese Patent Application No. 201711424112.X, filed on Dec. 25, 2017 and tiled "REFRIGERATOR AND LUMINOUS SHELF THEREOF", which is incorporated herein by reference in its entirety. The PCT International Patent Application was filed and published in Chinese.

TECHNICAL FIELD

The invention relates to a refrigerator and luminous shelf thereof, and belongs to the field of refrigeration equipment.

BACKGROUND

In order to facilitate a user to take and place foods in an existing refrigerator, generally, a lighting apparatus is provided in the refrigerator. Usually, a compartment of the current refrigerator is illuminated by hanging or mounting a lighting lamp on a shelf or a cabinet directly. However, with this lighting method, after the user places the foods on the shelf, especially when quantities of foods are in the refrigerator, the foods are prone to block light of the lighting lamp, which affects usage of the user.

In addition, in the refrigerator with an ordinary lighting apparatus, usually, a position close to the lighting apparatus has stronger light rays, which irritates vision of the user and causes discomfort to the user; light rays are weak at a position apart from the lighting apparatus, and the user is unable to see the foods placed in the refrigerator clearly, such that the light in the refrigerator has poor uniformity, a visual effect is poor, and the experience of the user is affected. With an improvement of the quality of life, simple lighting is unable to meet requirements for the lighting lamp of the refrigerator, and better visual and lighting effects are required gradually.

In recent years, some manufacturers fabricate a luminous shelf to meet market requirements. The luminous shelf comprises a shelf plate and a lighting device provided on one side of the shelf plate and emitting light to the shelf plate, and the light is reflected diffusely or refracted by means of light guide films attached to upper and lower surfaces of the shelf plate, thereby illuminating an interior of the cabinet uniformly. However, such a luminous shelf also has many defects, and is unable to illuminate a dead zone in the cabinet pertinently as required, and there is a safety risk because some lighting devices are powered through a cable.

In view of this, it is necessary to provide a new luminous shelf of a refrigerator to solve the above-mentioned problems.

SUMMARY

An object of the present invention is to provide a new refrigerator and a luminous shelf thereof, which may increase a lighting effect and an energy efficiency of lighting in the refrigerator, and avoid problems of poor light in a cabinet and poor visual effects.

In order to achieve the above-mentioned object, the present invention adopts the following technical solution: A luminous shelf, comprising: a shelf plate made of a transparent material, having an upper surface formed as a carrying plane of the luminous shelf; and a luminous strip lamp provided on one side of the shelf plate, a plurality of lamps being arranged in the luminous strip lamp at intervals in a length direction thereof, the luminous strip lamp having a mounting plane, and the plural lamps being arranged on the mounting plane and extending perpendicularly to the mounting plane; the luminous strip lamp is inclined to the shelf plate, such that an angle is formed between the mounting plane and the carrying plane, one part of light emitted by the luminous strip lamp entering the shelf plate, and another part bypassing the shelf plate to enter a surrounding space of the luminous shelf.

As a further improved technical solution of the present invention, the angle ranges from 20 to 70 degrees.

As a further improved technical solution of the present invention, the luminous shelf further comprises a support for supporting the shelf plate, and having an accommodating groove formed, the luminous strip lamp being arranged in the accommodating groove.

As a further improved technical solution of the present invention, the support comprises a trim located on an upper and/or lower surface(s) of the shelf plate and made of a transparent material.

As a further improved technical solution of the present invention, the luminous shelf further comprises a wireless power supply device comprising a transmitter connected with an external power source and a receiver electrically connected with the luminous strip lamp, the transmitter transmitting energy wirelessly to the receiver, so as to supply power to the luminous strip lamp.

As a further improved technical solution of the present invention, the receiver is provided in the accommodating groove.

As a further improved technical solution of the present invention, optical microstructures are provided on the surface and/or in an interior of the shelf plate, so as to refract or reflect diffusely the light entering the shelf plate, thereby illuminating the surrounding space of the luminous shelf.

As a further improved technical solution of the present invention, the optical microstructure comprises a polyhedral recess formed on the surface and/or in the interior of the shelf plate and having an irregular shape.

As a further improved technical solution of the present invention, the optical microstructure comprises a bubble or a light reflecting substance provided in the shelf plate.

In order to achieve the above-mentioned object, the present invention further provides a refrigerator, comprising the luminous shelf above-mentioned.

The present invention has such beneficial effects that compared with a prior art, the luminous shelf according to the present invention has a luminous strip lamp and a shelf plate which are provided obliquely, such that one part of light is emitted out through a microstructure in the shelf plate, another part of the light bypasses the shelf plate and illuminates an internal space of the cabinet directly, thereby illuminating an interior of the cabinet more effectively and eliminating a dead zone.

DETAILED DESCRIPTION

The present invention will be described below in detail in combination with specific embodiments illustrated in drawings. However, these embodiments have no limitations on the present invention, and any transformations of structure, method, or function made by persons skilled in the art according to these embodiments fall within the protection scope of the present invention.

Figure 1:
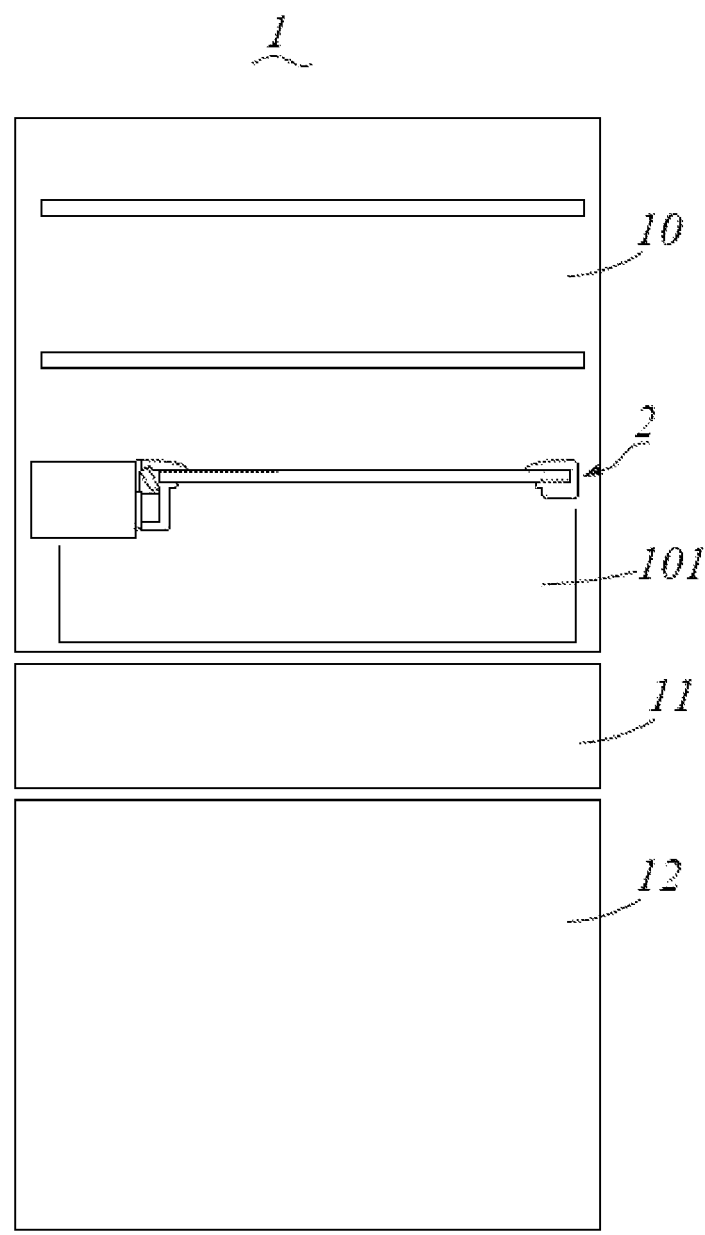
FIG. 1 is a schematic perspective diagram of a cabinet of a refrigerator according to a preferred embodiment of the present invention.

As shown in FIG. 1, a preferable refrigerator according to the present invention comprises a cabinet 1 and a door, and the cabinet 1 is provided therein with a plurality of storage compartments. In the present embodiment, the cabinet 1 comprises a refrigerating compartment 10, a switchable compartment 11 and a freezing compartment 12 from top to bottom, wherein the refrigerating compartment 10 is provided therein with one or more luminous shelf(s) 2. Certainly, in a variant of the embodiment, the refrigerating compartment 10, the freezing compartment 12 and the switchable compartment 11 may be arranged in other ways. In addition, the freezing compartment 12 or the switchable compartment 11 may also be provided therein with one or more luminous shelf(s) 2 as required.

Figure 2:
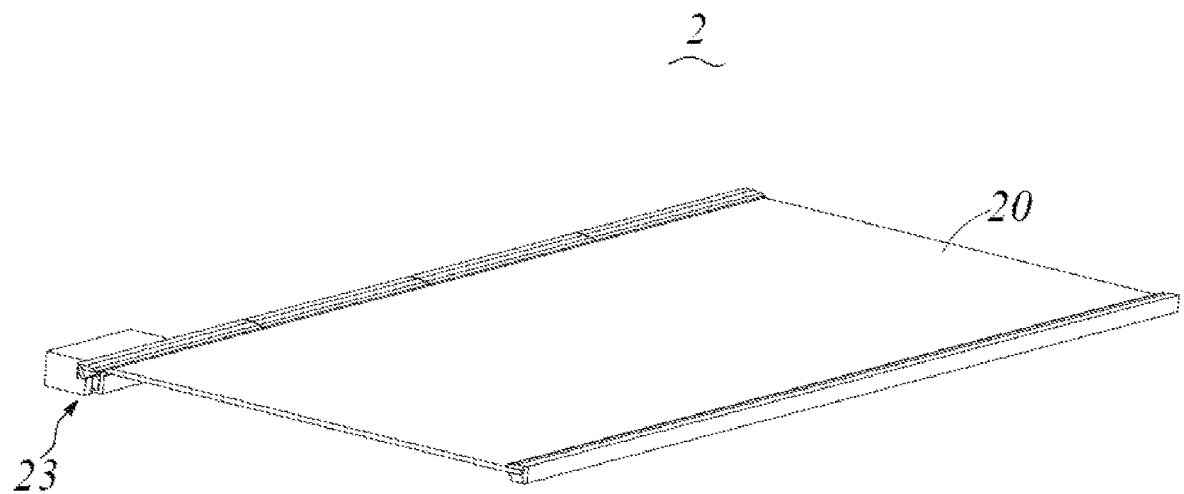
FIG. 2 is a schematic perspective diagram of a luminous shelf according to a preferred embodiment of the present invention.
Figure 3:
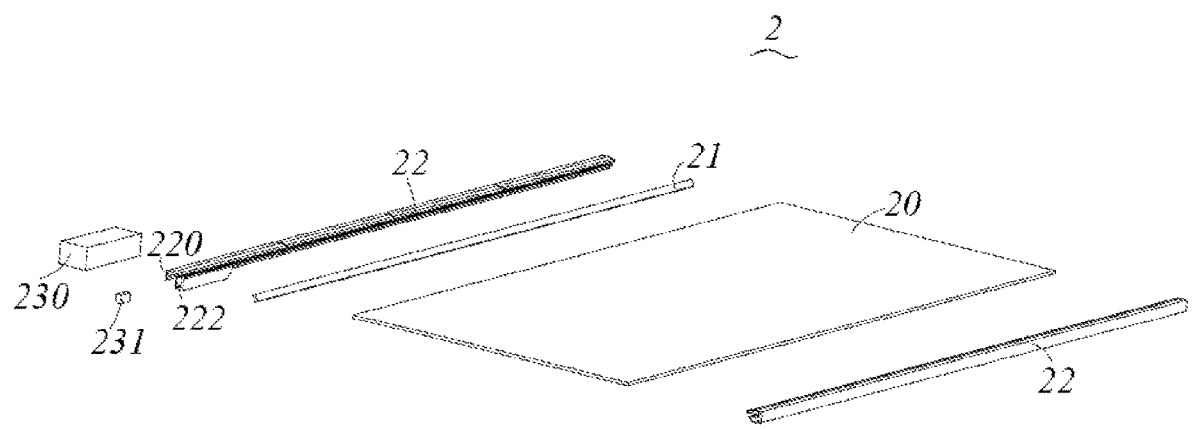
FIG. 3 is a schematic exploded diagram of the luminous shelf in FIG. 2.

In the preferred embodiments shown in FIGS. 1 to 3, a plurality of sets of mounting portions are provided on left and right side walls of the cabinet 1, and the luminous shelf 2 is connected onto the mounting portion movably in a clamping or overlapping manner. The luminous shelf 2 comprises a shelf plate 20 made of a transparent material, an upper surface of which is formed as a carrying plane of the luminous shelf 2, for placing an article. Generally, the shelf plate 20 is configured as a glass plate or an artificial crystal plate with a certain thickness.

The luminous shelf 2 further comprises a lighting apparatus comprising a luminous body. In the present preferred embodiment, the luminous body is configured as a luminous strip lamp 21 formed by assembling a plurality of lamps on a strip-shaped flexible circuit board or a PCB hard board. The plural lamps in the luminous strip lamp 21 are arranged at intervals in a length direction thereof. Preferably, 5 to 100 lamps are arranged in the luminous strip lamp 21 uniformly. The luminous strip lamp 21 is sleeved with a transparent sealing sleeve for water resistance. In the present embodiment, the lamp in the luminous strip lamp 21 is configured as an LED lamp with a luminous wavelength of 435 to 450 nm, and light in the wave band comprises blue light which may kill bacteria on the luminous shelf 2 effectively to play a role in purifying an environment in the refrigerator. Certainly, the luminous body may also be configured to have other shapes, and may also be configured as other lighting lamps, such as an incandescent lamp or a luminous color strip lamp, or the like.

The luminous strip lamp 21 is provided at an edge of one side of the shelf plate 20, for illuminating the shelf plate 20 and an adjacent area thereof, and in an electrified state, light emitted by the luminous strip lamp 21 diffuses from one side of the shelf plate 20 to an interior of the cabinet 1. In the preferred embodiment of the present invention, the luminous strip lamp 21 and the shelf plate 20 are provided obliquely. The present invention provides two embodiments of the luminous strip lamp 21. In the first embodiment, the luminous strip lamp 21 has a wide irradiation range and facilitates integral lighting in the cabinet 1. The second embodiment is a solution directed to a current situation where a drawer 101 in the cabinet 1 is not illuminated effectively and intended for illuminating the drawer 101 under the shelf plate 20. The first and second embodiments are respectively set forth specifically below.

Figure 4:
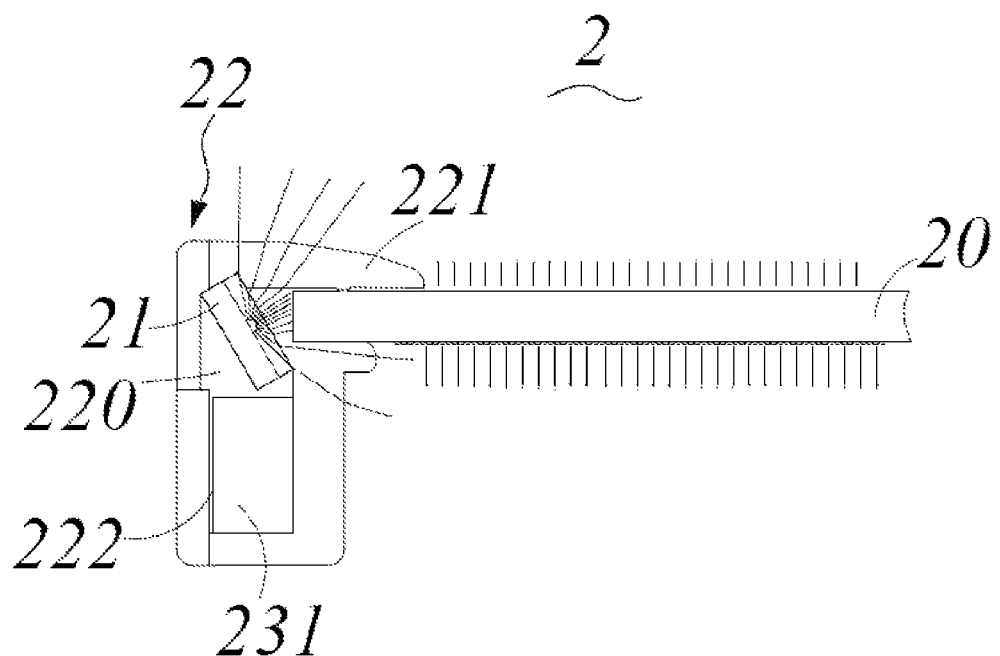
FIG. 4 is a diagram of light propagation of a first embodiment of the luminous shelf in FIG. 2.

As shown in FIG. 4, in the first embodiment of the present invention, the luminous strip lamp 21 has a mounting plane, and the plural LED lamps are arranged on the mounting plane and extending perpendicularly to the mounting plane, and the luminous strip lamp 21 is inclined to the shelf plate 20, such that an angle is formed between the mounting plane and the carrying plane of the shelf plate 20, one part of the light emitted by the luminous strip lamp 21 enters the shelf plate 20, and another part bypasses the shelf plate 20 to enter a surrounding space of the luminous shelf 2, i.e., the interior of the cabinet 1. The luminous strip lamp 21 and the shelf plate 20 are provided obliquely, such that the light of the LED lamp is emitted into the shelf plate 20 obliquely, and thus penetrates through the shelf plate 20 more easily to illuminate the space of the cabinet 1, thereby avoiding the light being blocked by an article placed on the shelf 2 since the light is only propagated in the shelf plate 20. Preferably, the angle ranges from 20 to 70 degrees.

The shelf plate 20 extends from left to right sides of the cabinet 1 in a horizontal direction. In the shown embodiment, the LED lamp extends towards the upper surface of the shelf plate 20 obliquely, such that the angle, formed between the mounting plane of the luminous strip lamp 21 and the carrying plane of the shelf plate 20, is 60 degrees. In other words, an obtuse angle is formed between the mounting plane of the luminous strip lamp 21 and an extension direction of the shelf plate 20, and a supplementary angle of the obtuse angle is 60 degrees. As such, one small part of the light of the LED lamp bypasses a lower surface of the shelf plate 20 directly to illuminate the space at the bottom of the shelf plate 20, and one part enters the shelf plate 20; by providing an optical structure in the shelf plate 20, the light is refracted or reflected diffusely to enable the upper and lower surfaces of the shelf plate to emit light, and another part of the light bypasses the upper surface of the shelf plate 20 and enters the space above the shelf 2 directly, thereby illuminating the shelf 2 and the surrounding space thereof.

Certainly, when the LED lamp is inclined towards the lower surface of the shelf plate 20, that is, an acute angle of 20 to 70 degrees is formed between the mounting plane of the luminous strip lamp 21 and the carrying plane of the shelf 2, the shelf 2 and the surrounding space thereof may also be illuminated.

In the second embodiment referring to FIG. 5, the luminous strip lamp 21 and the shelf plate 20 are provided obliquely, and an angle of 60 degrees is formed between the mounting plane of the luminous strip lamp 21 and the carrying plane of the shelf plate 20, so as to illuminate the space below the shelf plate 20. When the LED lamp is inclined towards the lower surface of the shelf plate 20, and forms the angle with an extending line of the shelf plate 20, one part of the light of the luminous strip lamp 21 enters the shelf plate 20, and another part bypasses the lower surface of the shelf plate 20 to enter the space below the shelf plate 20, thereby illuminating sufficiently the drawer 101 without an independent lighting structure, and solving the problem of insufficient light in the drawer 101 for a long time.

As shown in FIGS. 2 and 3, the shelf 2 further comprises a support 22 for supporting the shelf plate 20. In the process of mounting the shelf 2 to the cabinet 1 of the refrigerator, the support 22 is connected movably with the mounting portions on the left and right sides of the cabinet 1. Certainly, the support 22 may also be provided on each of front and rear sides of the shelf plate 20. In the present embodiment, the support 22 is provided with a trim 221 for fixing a lateral side of the shelf plate 20 and decorating a connecting position between the shelf plate 20 and the support 22, and generally, the trim 221 is made of a flexible material to provide a function of vibration reduction.

An accommodating groove 220 is formed in the support 22 and provided therein with the luminous strip lamp 21, such that the luminous strip lamp 21 may be fixed at the edge of one side of the shelf plate 20 to illuminate the shelf plate 20. Specifically, as mentioned before, the luminous strip lamp 21 is fixed into the accommodating groove 220 obliquely. In the present embodiment, the trim 221 is provided at every contact position between the lateral side of the shelf plate 20 and the support 22. That is, the trim 221 is provided on each of the upper and lower surfaces of the shelf plate 20, and made of a transparent material, such that when the luminous strip lamp 21 has a large oblique angle to enable one part of the light to enter the trim 221, this part of the light may penetrate the trim 221 and enter the space in the cabinet 1, thereby avoiding loss of light energy. Certainly, in other embodiments, the support 22 is only provided with the trim 221 located on the upper or lower surface of the shelf plate 20.

In the preferred embodiment of the present invention, optical microstructures are provided on the surface and/or in the interior of the shelf plate 20, so as to refract or reflect diffusely the light entering the shelf plate 20, thereby illuminating the surrounding space of the luminous shelf 2. The microstructure herein refers to a tiny structure which enables the light to be emitted out from a position where the microstructure is located. In the present invention, the microstructure may be realized by printing, laser engraving, pad pasting, or the like, as long as an optical property at the position where the microstructure is located may be changed to cause the light to be emitted out from this position. Moreover, the microstructure is designed by an optical engineer, and parameters thereof, such as a shape, a size, a depth, or the like, are defined according to a technology.

Thus, the light emitted from the luminous strip lamp 21 is transmitted in the shelf plate 20, reflected and refracted repeatedly, and then emitted out from the position where the microstructure of the shelf plate 20 is located. Taking laser processing as an example, energy of laser is focused on a surface of glass to generate a microcrack and form a polyhedral recess having an irregular shape, and the shelf plate 20 manufactured with this technology has a good light conductivity due to a good plane reflection performance of the microcrack in different directions; similarly, by regulating process parameters, the laser processing may be focused on the interior of the shelf plate 20 to realize a nonsurface microcrack, i.e., inner laser engraving, and in this case, the surface is not damaged, and a light guiding effect is achieved at the same time. In addition, since the size of these 'microcracks' is negligible almost relative to the glass plate, processing hardly affects a mechanical property of the shelf plate 20 with a load requirement.

The microstructure (i.e., the polyhedral recess formed by the above-mentioned laser processing) may be realized through the laser inner engraving. Similarly, the same effect may also be achieved by adding a bubble or a light reflecting substance at a corresponding position in production of the shelf plate 20. In the latter case, the added bubble or the light reflecting substance is configured as the corresponding microstructure.

By providing the microstructure in the shelf plate 20, the light entering the shelf plate 20 may be emitted out from the upper and/or lower surface(s) of the shelf plate 20 by refraction or diffused reflection, thereby illuminating the shelf plate 20 and the space(s) above and/or below the shelf plate 20, and achieving better lighting effects.

Figure 5:
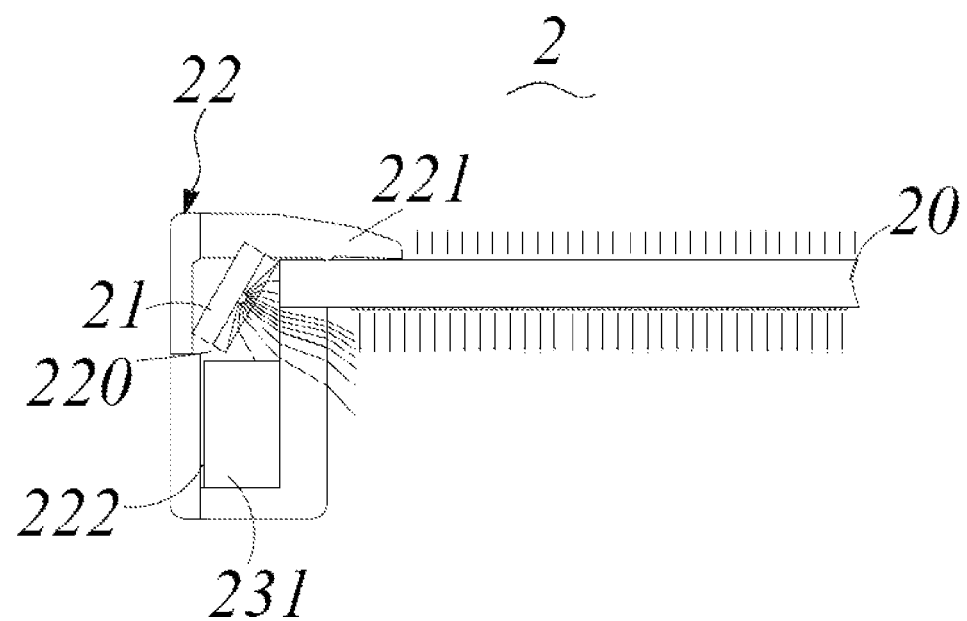
FIG. 5 is a diagram of light propagation of a second embodiment of the luminous shelf in FIG. 2.

As shown in FIGS. 3 to 5, the lighting apparatus further comprises a wireless power supply device 23 for supplying power to the luminous body, and in the present preferred embodiment, the power supply device is powered wirelessly. The wireless power supply device 23 comprises a transmitter 230 connected with an external power source and a receiver 231 electrically connected with the luminous strip lamp 21, and the transmitter 230 transmits energy wirelessly to the receiver 231, so as to supply power to the luminous strip lamp 21.

In the present embodiment, the receiver 231 is provided in the support 22. Specifically, the receiver 231 is provided in a receiving groove 222 below the accommodating groove 220, and electrically connected with the luminous strip lamp 21, for supplying power thereto. The transmitter 230 is provided in the cabinet 1. Preferably, the transmitter 230 is provided close to the mounting portion of the cabinet 1, and in the present embodiment, provided in a liner of the cabinet 1.

Preferably, the transmitter 230 and the receiver 231 are movable relative to each other by a distance of L≤2 mm in the front and rear direction, a distance of W≤5 mm in the left and right direction, and a distance of H≤3 mm in the up and down direction; when the distance between the transmitter 230 and the receiver 231 is in the above-mentioned range of movable distance based on a reference distance, the wireless power supply device 23 has an optimal transmission power, and a lowest power loss at a transmitting end, thereby having the lowest converted heat, and remarkably alleviating the problem of affecting a refrigerating effect due to serious heating of the wireless power supply device 23.

The transmitter 230 comprises a transmitting coil, a power circuit, a high frequency oscillating circuit and a high frequency power amplifying circuit. With a direct voltage of the refrigerator itself, the high frequency oscillating circuit is responsible for generating a high frequency alternating current (generally a high frequency current of 20 KHz to 200 KHz), which is amplified by the high frequency power amplifying circuit and then sent out by the transmitting coil in the form of electromagnetic energy. The receiver 231 comprises a receiving coil close to the transmitting coil and an LED rectifier bridge. In this way, when the high frequency alternating current flows through the transmitting coil, due to electromagnetic induction, an induction current may be generated in the receiving coil, thereby supplying electric energy to the luminous body.

Since the transmitting coil of the emitter 230 is separated from the receiving coil of the receiver 231, in order to enhance electromagnetic coupling therebetween, the coils are provided on two tank-type magnetic cores respectively, which are close to each other to better close a magnetic line of force, so as to increase the efficiency of energy transmission.

The luminous body is powered by the wireless power supply device 23, which has the advantage of saving many tedious cable layouts. When the door of the refrigerator is opened, the transmitter 230 in the cabinet 1 transmits a signal, and the receiver 231 in the shelf 2 receives the signal, then generates electricity and drives the luminous body to emit the light, one part of which is emitted into the shelf plate 20 of the shelf 2, passes through the upper and lower surfaces of the shelf plate 20 and the microstructure therein, and illuminates the interior of the cabinet 1 uniformly, without generating a dead zone. Another part of the light enters the transparent trim 221, is refracted and illuminates the space above or below the shelf plate 20, thereby illuminating the interior of the cabinet 1 effectively.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present invention, and is not intended to limit the protection scope of the present invention. Equivalent embodiments or modifications made within the spirit of the present invention shall fall within the protection scope of the present invention.

What is claimed is:

1. A luminous shelf, comprising:
   a shelf plate made of a transparent material, having an upper surface formed as a carrying plane of the luminous shelf; and
   a luminous strip lamp provided on one side of the shelf plate, a plurality of lamps being arranged in the luminous strip lamp at intervals in a length direction thereof, the luminous strip lamp having a mounting plane facing a lateral side of the shelf plate, and the plural lamps being arranged on the mounting plane and extending perpendicularly to the mounting plane;
   wherein the luminous shelf comprising a support for supporting the shelf plate, the support having an accommodating groove formed therein outside the shelf plate and comprising a trim extending to be located on at least one of an upper surface and a lower surface of the shelf plate and to fix the lateral side of the shelf plate, the luminous strip lamp is sleeved with a transparent sealing sleeve and is arranged in the accommodating groove, the trim is made of a transparent material;
   the luminous strip lamp is held in position by the trim of the support to be inclined to the shelf plate, such that an angle is formed between the mounting plane and the carrying plane, one part of light emitted by the luminous strip lamp entering the shelf plate, and another part penetrating the trim and bypassing the shelf plate to enter a surrounding space of the luminous shelf;
   the luminous shelf comprising a wireless power supply device comprising a transmitter connected with an external power source and a receiver electrically connected with the luminous strip lamp, the transmitter transmitting energy wirelessly to the receiver, the receiver is provided in the support and in a receiving groove below the accommodating groove, so as to supply power to the luminous strip lamp.

2. The luminous shelf according to claim 1, wherein the angle ranges from 20 to 70 degrees.

3. The luminous shelf according to claim 1, wherein optical microstructures are provided on the surface and/or in an interior of the shelf plate, so as to refract or reflect diffusely the light entering the shelf plate, thereby illuminating the surrounding space of the luminous shelf.

4. The luminous shelf according to claim 3, wherein each of the optical microstructures comprises a polyhedral recess formed on the surface and/or in the interior of the shelf plate and having an irregular shape.

5. The luminous shelf according to claim 3, wherein each of the optical microstructures comprises a bubble or a light reflecting substance provided in the shelf plate, or a polyhedral recess having an irregular shape produced by the laser inner engraving and provided in the shelf plate.

6. A refrigerator, comprising a cabinet, wherein the luminous shelf according to claim 1 is provided in the cabinet.

7. The luminous shelf according to claim 1, wherein the transmitter and the receiver are movable relative to each other by a distance of $L \leq 2$ mm in the front and rear direction, a distance of $W \leq 5$ mm in the left and right direction, and a distance of $H \leq 3$ mm in the up and down direction.

8. The refrigerator according to claim 6, wherein a plurality of sets of mounting portions are provided on left and right side walls of the cabinet, the luminous shelf is connected onto the mounting portion movably in a clamping or overlapping manner, the transmitter is provided close to the mounting portion, the support is connected movably with the mounting portions.

* * * * *